United States Patent
Yamamoto et al.

(10) Patent No.: US 10,032,055 B2
(45) Date of Patent: Jul. 24, 2018

(54) OPTICAL INFORMATION READER

(71) Applicant: DENSO WAVE INCORPORATED, Chita-gun, Aichi-pref. (JP)

(72) Inventors: Kenryo Yamamoto, Takahama (JP); Makoto Ito, Nagoya (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/258,407

(22) Filed: Sep. 7, 2016

(65) Prior Publication Data
US 2017/0068834 A1 Mar. 9, 2017

(30) Foreign Application Priority Data

Sep. 7, 2015 (JP) ................... 2015-175442
Jul. 22, 2016 (JP) ................... 2016-144238

(51) Int. Cl.
*G06K 7/10* (2006.01)
*G06K 7/14* (2006.01)

(52) U.S. Cl.
CPC ..... *G06K 7/10722* (2013.01); *G06K 7/10732* (2013.01); *G06K 7/10831* (2013.01); *G06K 7/1417* (2013.01); *G06K 2207/1011* (2013.01)

(58) Field of Classification Search
None
See application file for complete search history.

(56) References Cited

U.S. PATENT DOCUMENTS

2009/0039161 A1* 2/2009 Matsushima ...... G06K 7/10712
  235/454
2013/0334314 A1* 12/2013 Vinogradov ....... G06K 7/10722
  235/462.21
2015/0097035 A1 4/2015 Duan et al.

FOREIGN PATENT DOCUMENTS

DE  202012100278 U1  5/2013
EP       0423645 A2  4/1991
JP     2009020722 A  1/2009

* cited by examiner

*Primary Examiner* — Kristy A Haupt
(74) *Attorney, Agent, or Firm* — Oliff PLC

(57) ABSTRACT

An information code reader is provided to read an information code, such as a QR code (registered trademark). In this reader, a marker light irradiating unit is provided in a position farther away from a reading opening than a reflective mirror is, and disposed such that an optical axis of a marker light is parallel to an optical axis that is a center of an imaging area of a light receiving sensor and the marker light is close to (or in proximity to) an upper edge (outer edge) of the reflective mirror.

15 Claims, 16 Drawing Sheets

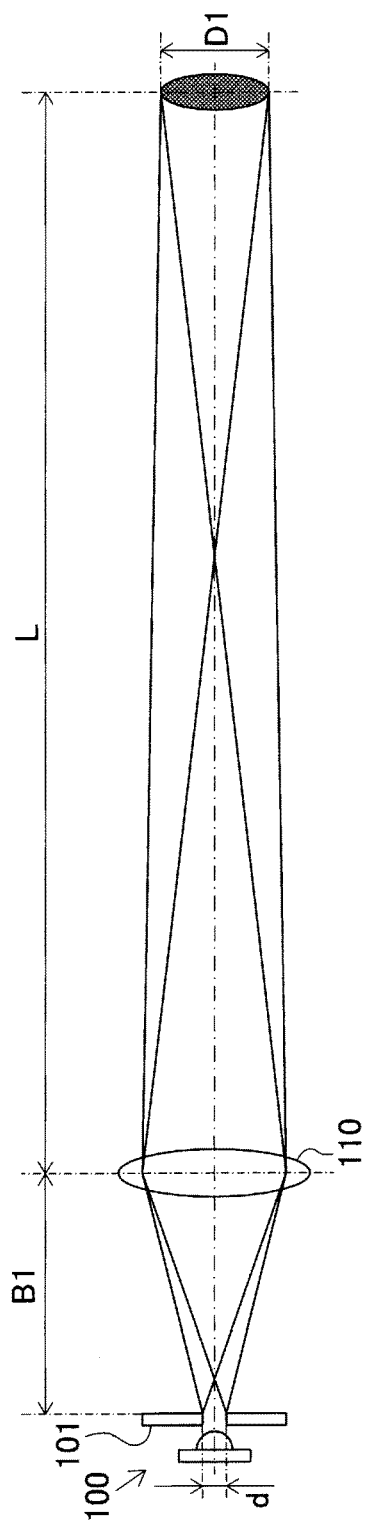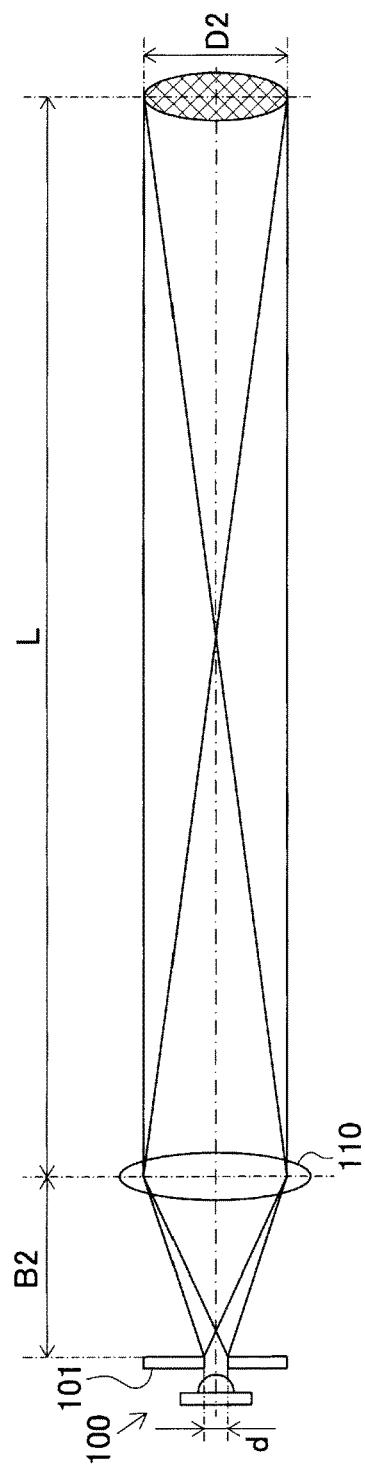

OPTICAL INFORMATION READER

CROSS-REFERENCE TO RELATED APPLICATION

This application is based on and claims the benefit of priority from earlier Japanese Patent Applications No. 2015-175442 filed Sep. 7, 2015 and No. 2016-144238 filed Jul. 22, 2016, the descriptions of which are incorporated herein by reference.

BACKGROUND

Technical Field

The present invention relates to an optical information reader that optically reads an information code or the like.

Related Art

Conventionally, when an information code, such as a barcode or a QR code (registered trademark), is optically read, reading of the information code is facilitated by a marker light being irradiated onto a reading target to which the information code is attached. The marker light indicates the center of an imaging area.

However, when the center of the imaging area is indicated using the marker light, a problem occurs in that a slight misalignment is present between the actual center of the imaging area and the center of the marker light. This problem becomes more significant as the distance between the reading target and the reader becomes shorter.

A reason this problem occurs is that, when an attempt is made to bring an optical axis of the marker light and an optical axis that is the center of the imaging area closer together, a light receiving sensor and a marker light source are required to be disposed such as to be separated, depending on the sizes of the light receiving sensor and the marker light source, as well as the areas required to mount the light receiving sensor and the marker light source.

To solve this problem, for example, an optical information reader disclosed in JP-A-2009-020722, described below, is known. In this optical information reader, two marker optical systems are provided, one on each side of the light receiving sensor. The light receiving sensor is disposed between a right-side marker optical system and a left-side marker optical system, such as to be positioned on a virtual line connecting an optical axis of the right-side marker light and an optical axis of the left-side marker light. Therefore, a center axis that is the center of the overall marker light including the right-side marker light and the left-side marker light, and a light reception optical axis of the light receiving sensor can be matched. As a result, a readable area and a reading center position of the readable area can be explicitly indicated with accuracy, regardless of the distance between a reading opening and the reading target.

However, in a configuration that requires a plurality of marker light irradiating units (marker light sources), such as that described above, in addition to increase in manufacturing cost due to a larger number of components, a problem occurs in that size reduction of the reader becomes difficult because two marker optical systems are required to be disposed, one on each side of the light receiving sensor.

SUMMARY

It is thus desired to provide an optical information reader (or optical information reading apparatus) that is capable of reducing misalignment between a center of a marker light and a center of an imaging area, without inhibiting size reduction.

In a first mode of the disclosure, an information code reader includes: a light receiving sensor that is capable of imaging an information code; a reflective mirror that reflects reflected light from the information code entering through a reading opening towards the light receiving sensor; an imaging lens that collects the light reflected by the reflective mirror and forms an image in the light receiving sensor; and a marker light irradiating unit that irradiates a marker light indicating a center of an imaging area provided by the light receiving sensor. The marker light irradiating unit is provided in a position farther away from the reading opening than the reflective mirror, and disposed such that an optical axis of the marker light is parallel to an optical axis that is the center of the imaging area provided by the light receiving sensor and the marker light is close to or in proximity to (or adjacent to) an outer edge of the reflective mirror.

In addition, in a second mode of the disclosure, an information code reader includes: a light receiving sensor that is capable of imaging an information code; an imaging lens that collects reflected light from the information code and forms an image in the light receiving sensor; a marker light irradiating unit that irradiates a marker light indicating a center of an imaging area provided by the light receiving sensor; and a reflective element that reflects the marker light irradiated from the marker light irradiated unit towards the imaging area provided by the light receiving sensor. The reflective element is disposed outside of the imaging area provided by the light receiving sensor and near the imaging lens, such that an optical axis of the reflected marker light and an optical axis hat is the center of the imaging area provided by the light receiving sensor are parallel and close to each other.

In particular, in the first mode according to the disclosure, the marker light irradiating unit is provided in a position farther away from the reading opening than the reflective mirror. The marker light irradiating unit is disposed such that the optical axis of the marker light is parallel to the optical axis that is the center of the imaging area provided by the light receiving sensor, and the marker light is close to the outer edge of the reflective mirror. As a result, regarding the distance between the optical axis of the marker light and the optical axis that is the center of the imaging area, effects of the sizes of the light receiving sensor and the marker light irradiating unit, the areas required for mounting the light receiving sensor and the marker light irradiating unit, and the like can be eliminated. That is, because the marker light passes near the outer edge of the reflective mirror, the distance between the optical axis of the marker light and the optical axis that is the center of the imaging area is determined based on the size of the reflective mirror. Therefore, misalignment between the center of the marker light and the center of the imaging area can be reduced without inhibiting size reduction of the optical information reader.

In a preferred embodiment of the first mode, the marker light irradiating unit is disposed such that the marker light is close to an edge portion of the outer edge of the reflective mirror close to the imaging lens. As a result, the marker light is irradiated such as to be closer to a substrate surface on which the light receiving sensor is mounted, than the optical axis that is the center of the imaging area. Therefore, the height of an optical system in a direction perpendicular to the substrate surface can be reduced. Further size reduction of the optical information reader can be achieved.

In another embodiment of the first mode, the reflective mirror is formed such that an overall surface of a reflective surface matches the imaging area provided by the light receiving sensor. As a result, the size of the reflective mirror can be reduced without the imaging area being changed. Therefore, the misalignment between the center of the marker light and the center of the imaging area can be further reduced.

In another embodiment of the first mode, the marker light irradiating unit is mounted on the same substrate as the light receiving sensor. The marker light irradiating unit is provided with a marker light reflective mirror that reflects the marker light irradiated from the marker light irradiating unit such that the optical axis of the maker light is parallel to the optical axis that is the center of the imaging area provided by the light receiving sensor and the marker light is close to an outer edge of the reflective mirror. As a result, even when the marker light irradiating unit and the light receiving sensor are mounted on the same substrate, the distance between the optical axis of the marker light and the optical axis that is the center of the imaging area is determined based on the size of the reflective mirror. Therefore, further size reduction of the optical information reader can be achieved while reducing the misalignment between the center of the marker light and the center of the imaging area.

In the second mode according to the disclosure, a reflective element is provided. The reflective element reflects the marker light irradiated from the marker light irradiating unit towards the imaging area provided by the light receiving sensor. The reflective element is disposed outside of the imaging area provided by the light receiving sensor and near the imaging lens, such that the optical axis of the reflected marker light and the optical axis that is the center of the imaging area provided by the light receiving sensor are parallel and close to each other. As a result, regarding the distance between the optical axis of the marker light and the optical axis that is the center of the imaging area, the effects of the sizes of the light receiving sensor and the marker light irradiating unit, the areas required to mount the light receiving sensor and the marker light irradiating unit, and the like can be eliminated. That is, because the imaging area is becomes narrow near the imaging lens, the reflective element can be more easily placed near the optical axis that is the center of the imaging area, without entering the imaging area. Therefore, the misalignment between the center of the marker light and the center of the imaging area can be reduced without inhibiting size reduction of the optical information reader.

In a preferred embodiment of the second mode, the reflective element has an entry face, an exit face, and a reflective surface. The reflective surface internally reflects the marker light that has entered from the entry face towards the exit face such that the optical axis of the marker light is parallel to the optical axis that is the center of the imaging area. The reflective element is configured as a collimate lens that collects and collimates the marker light based on a curvature of at least either of the entry face and the exit face. As a result, the reflective element provides both a function as a collimate lens for the marker light and a function as a reflective lens. Therefore, a collimate lens is not required in the marker light irradiating unit. The number of components can be reduced, and size reduction of the optical information reader can be achieved.

In another embodiment of the second mode, the reflective element is formed such that the curvature of the exit face is greater than the curvature of the entry lens. In a lens of which the entry face is a planar surface and the exit face is a curved surface, the distance from the position of a diaphragm of the marker light irradiating unit to the curved surface is longer than that in a lens of which the entry face is a curved surface and the exit face is a planar surface. That is, as a result of the lens being formed such that the curvature of the exit face is greater than the curvature of the entry face, compared to when the lens is formed such that the curvature of the exit face is smaller than the curvature of the entry face, effects are equivalent to that when the lens is placed farther from the position of the diaphragm of the marker light irradiating unit. In addition, even when the marker light is collimated and emitted, should the distance from the lens to the reading target and the diameter of the diaphragm of the marker light irradiating unit be fixed, a spot diameter of the marker light irradiated onto the reading target becomes smaller as the distance from the position of the diaphragm to the lens increases. The marker light becomes brighter. Therefore, as a result of the curvature of the exit face being set to be greater than the curvature of the entry face, the marker light can be made brighter due to the spot diameter becoming smaller. Visibility of the marker light can be improved.

In another embodiment of the second mode, the reflective element is configured as a lens that has a reflective surface that performs internal reflection. The exit face of the reflective element is provided with a diffractive optical element that diffracts the marker light that has been internally reflected by the reflective surface, to form a predetermined pattern. As a result, even when the marker light that is formed into a predetermined pattern is irradiated such as to indicate the outer edges of the imaging area, misalignment between the center of the predetermined pattern functioning as the marker light and the center of the imaging area can be reduced.

BRIEF DESCRIPTION OF THE DRAWINGS

In the accompanying drawings:

FIG. 13A is an explanatory diagram for explaining a spot diameter of a marker light in a case in which a diaphragm is positioned relatively far from a lens;

FIG. 13B is an explanatory diagram for explaining the spot diameter of the marker light in a case in which the diaphragm is positioned relative close to the lens;

DETAILED DESCRIPTION OF THE PREFERRED EMBODIMENTS

[First Embodiment]

An optical information reader (or an optical information reading apparatus) according to a first embodiment of the present invention will hereinafter be described with reference to the drawings.

An optical information reader 10 according to the present embodiment is configured as an information code reader that optically reads an information code. For example, the information code is a one-dimensional code or a two dimensional code. Here, as the one-dimensional code, for example, a so-called barcode, such as a Japanese Article Numbering (JAN) code, an International Article Number (FAN), a Universal Product Code (UPC), an Interleaved Two of Five (ITF) code, a Code 39, a Code 128, or NW-7, is assumed. In addition, as the two-dimensional code, for example, a rectangular information code, such as the QR code, a DataMatrix code, a MaxiCode, or an Aztec code, is assumed.

Figure 2:
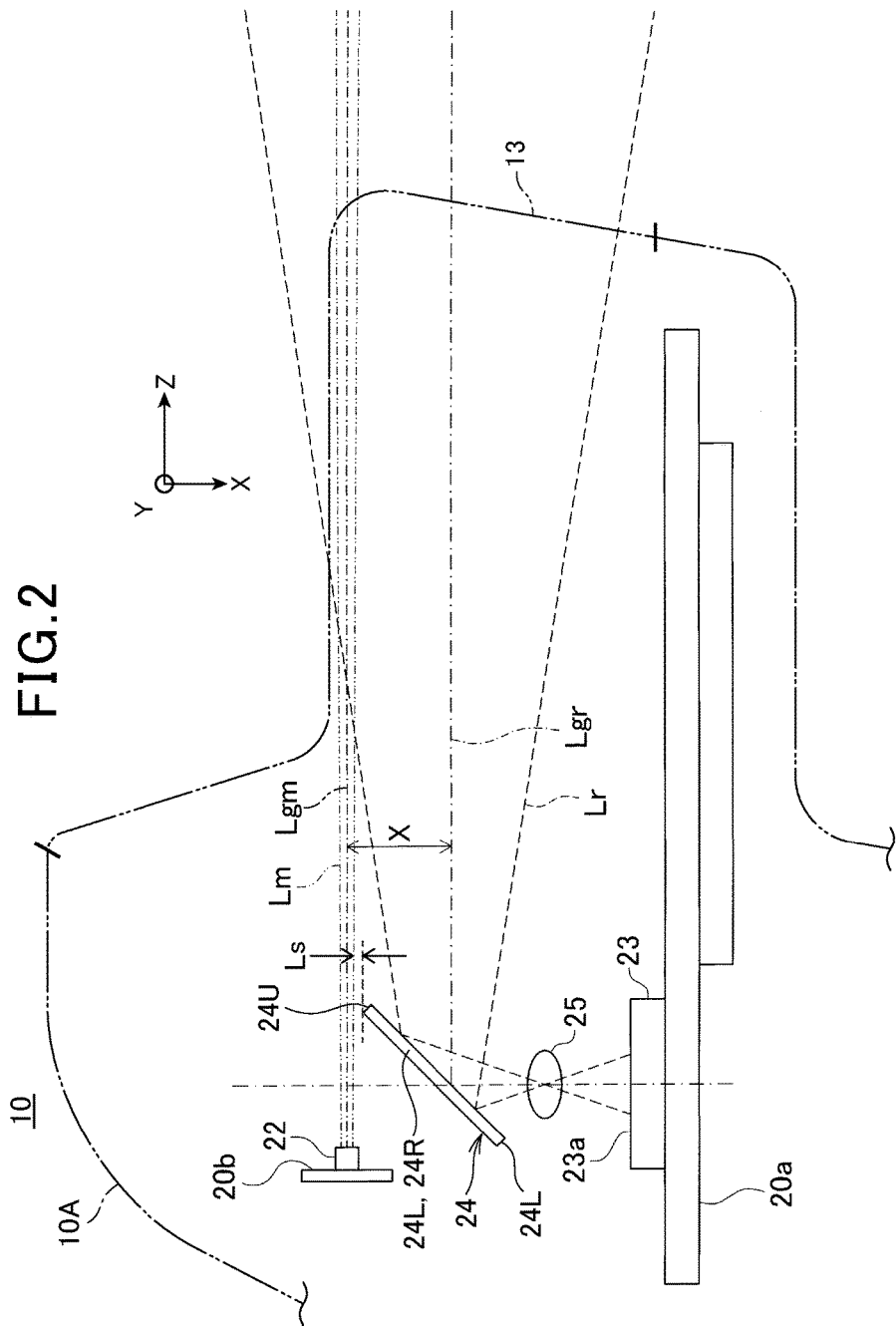
FIG. 2 is an explanatory diagram of a positional relationship between a marker light irradiating unit and a reflective mirror according to the first embodiment.

The optical information reader 10 is configured such that a circuit unit 20 is housed inside a case 10A (as shown in FIG. 2). The circuit unit 20 mainly includes an optical system and a microcomputer system. The optical system is provided with an illumination light source 21, a marker light irradiating unit 22, a light receiving sensor 23, and the like. The microcomputer system includes a memory 35, a control circuit 40, and the like.

The optical system is divided into a light projection optical system and a light reception optical system. The light projection optical system is composed of the illumination light source 21 and the marker light irradiating unit 22. The illumination light source 21 functions as an illumination light source capable of emitting an illumination light Lf. For example, the illumination light source 21 is configured by a light emitting diode (LED) and a lens provided on the outgoing side of the LED. In FIG. 2, the illumination light source 21 is omitted for convenience.

Figure 1:
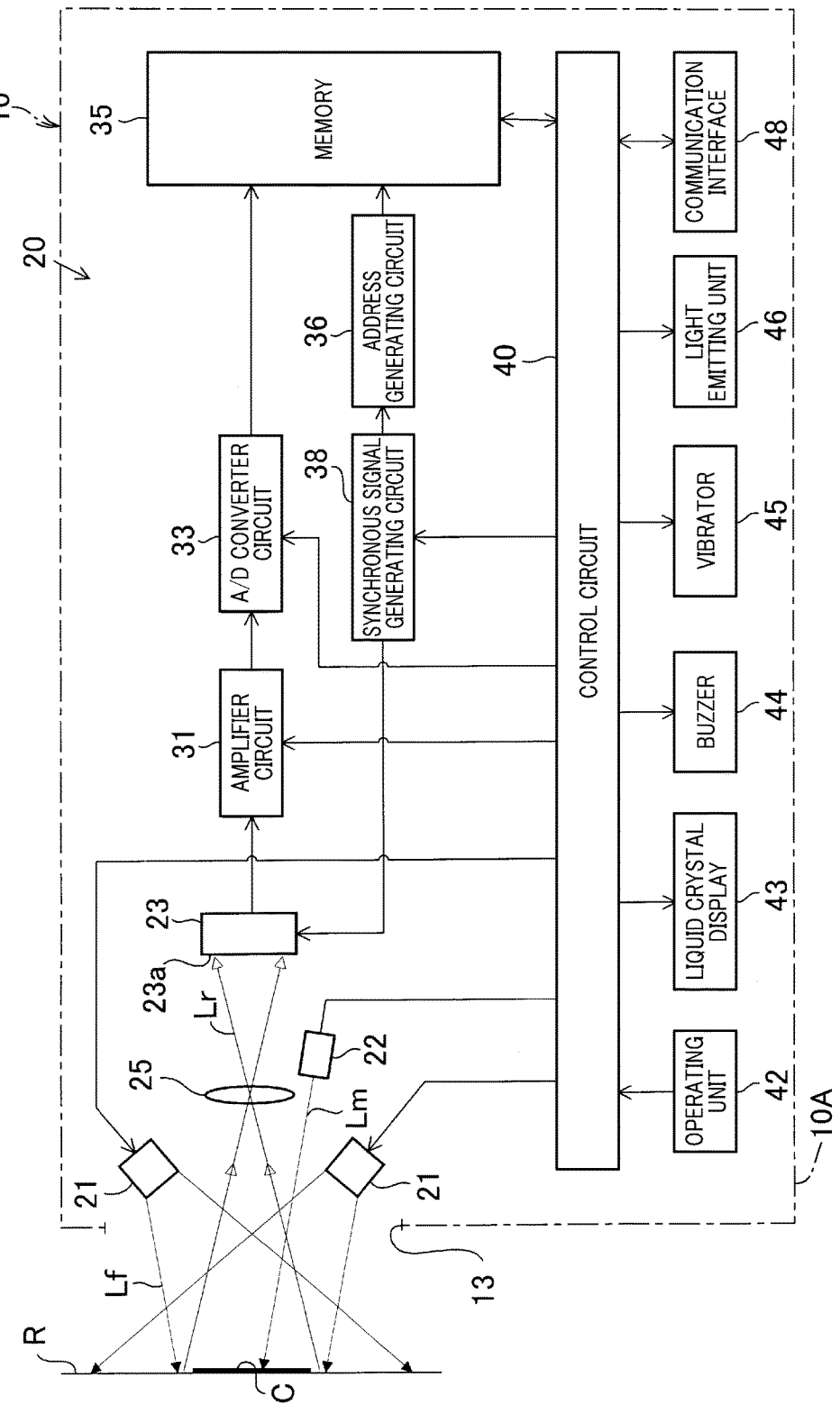
FIG. 1 is a block diagram schematically showing a configuration of an optical information reader according to a first embodiment.

The marker light irradiating unit 22 functions as a marker light source capable of irradiating a beam-shaped marker light Lm. The marker light Lm indicates the center of an imaging area provided by the light receiving sensor 23. For example, the marker light irradiating unit 22 is configured by an LED and a lens provided on the outgoing side of the LED. FIG. 1 conceptually shows an example in which the illumination light Lf and the beam-shaped marker light Lm are irradiated towards a reading target R. An information code C is attached to the reading target R.

The light reception optical system is composed of the two-dimensional light receiving sensor 23, a rectangular (or square) reflective mirror 24, an imaging lens 25, and the like. For example, the light receiving sensor 23 is configured as an area sensor that is capable of imaging the information code C. In the light receiving sensor 23, light receiving elements are arrayed in a two-dimensional manner. The light receiving element is a solid-state image sensor, such as a complementary metal-oxide-semiconductor (CMOS) or a charge-coupled device (CCD). The light-receiving sensor 23 outputs an electrical signal (that is, performs imaging) based on the intensity of a reflected light Lr, for each cell (pattern) of the information code that has received light. As shown in FIG. 2, the light receiving sensor 23 is mounted on a substrate 20a such as to be capable of receiving incident light entering through the imaging lens 25.

As shown in FIG. 2, the reflective mirror 24 functions to reflect the reflected light Lr from the information code C towards the light receiving sensor 23. The reflected light Lr is incident on the reflective mirror 24 from the outside, through a reading opening 13. The reading opening 13 is a window formed through part of the case 10A, so that light can be transmitted through the window. The reflective mirror 24 is held together with the imaging lens 25 by a holder (not shown). In particular, according to the present embodiment, the reflective mirror 24 reflects the reflected light Lr towards the light receiving sensor 23 at a substantially right angle. In FIG. 1, the reflection direction of the reflected light Lr is simplified for convenience. In addition, the reflective mirror 24 is also omitted in FIG. 1.

The imaging lens 25 functions as an image formation optical system that is capable of collecting the light reflected by the reflective mirror 24 and forming an image on a light receiving surface 23a of the light receiving sensor 23. According to the present embodiment, the imaging lens 25 collects the reflected light Lr from the information code C reflected by the reflective mirror 24 and forms a code image on the light receiving surface 23a of the light receiving sensor 23.

The microcomputer system is configured by an amplifier circuit 31, an analog-to-digital (A/D) converter circuit 33, a memory 35, an address generating circuit 36, a synchronous signal generating circuit 38, a control circuit 40, an operating unit 42, a liquid crystal display 43, a buzzer 44, a vibrator 45, a light emitting unit 46, a communication interface 48, and the like. As the name implies, the microcomputer system is mainly configured by the control circuit 40 and the memory 35. The control circuit 40 is capable of functioning as a microcomputer (information processing unit). The microcomputer system is capable of performing signal processing, by hardware or software, on an image signal of an information code imaged by the above-described optical system. In addition, the control circuit 40 also performs control related to the overall system of the optical information reader 10.

The image signal (analog signal) outputted from the light receiving sensor 23 of the optical system is amplified at a predetermined amplification rate by being inputted to the amplifier circuit 31. Then, the amplified image signal is inputted to the A/D converter circuit 33 and converted from an analog signal to a digital signal. When the digitalized image signal, that is, image data (image information) is generated and inputted to the memory 35, the image data is collected in a predetermined code image information storage area. The synchronous signal generating circuit 38 is capable of generating a synchronous signal for the light receiving sensor 23 and the address generating circuit 36. The address generating circuit 36 is capable of generating a storage address of the image data stored in the memory 35, based on the synchronous signal supplied from the synchronous signal generating circuit 38.

The memory 35 is a semiconductor memory device. For example, a random access memory (such as a dynamic random access memory [DRAM] or a static random access memory [SRAM]) and a read-only memory (ROM) (such as an erasable programmable read-only memory [EPROM] or an electrically erasable programmable read-only memory [EEPROM]) correspond to the memory 35. In addition to the above-described image data collection region, a work area and a reading condition table can also be secured in the RAM of the memory 35. The work area is used by the control circuit 40 during processing, such as arithmetic operations and logic operations. In addition, a reading program, a system program, and the like are stored in advance in the ROM. The reading program enables a reading process for optically reading an information code to be performed. The system program enables control of hardware, such as the illumination light source 21 and the light receiving sensor 23.

The control circuit 40 is a microcomputer that is capable of controlling the overall optical information reader 10. The control circuit 40 is composed of a central processing unit (CPU), a system bus, an input/output interface, and the like. The control circuit 40, together with the memory 35, can configure an information processing unit and provides an information processing function. The control unit 40 functions to perform an interpreting (decoding) process on a code image of an information code captured by the light receiving sensor 23 and stored in the memory 35. In addition, the control unit 40 is capable of connecting to various input and output apparatuses (peripheral apparatuses) via an input/output interface provided therein. According to the present embodiment, the operating unit 42, the Liquid crystal display 43, the buzzer 44, the vibrator 45, the light emitting unit 46, the communication interface 48, and the like are connected to the control circuit 40.

The operating unit 42 is configured by a plurality of keys. The operating unit 42 provides the control circuit 40 with an operating signal based on key operation by a user. Upon receiving the operating signal from the operating unit 42, the control circuit 40 performs an operation based on the operating signal. The liquid crystal display 43 is configured by a publicly known liquid crystal panel. The control unit 40 controls the display content of the liquid crystal display 43. The buzzer 44 is configured by a publicly known buzzer. The buzzer 44 generates a predetermined sound based on an operation signal from the control unit 40. The vibrator 45 is configured by a publicly known vibrator that is mounted in portable apparatuses. The vibrator 45 generates vibrations based on a drive signal from the control circuit 40. The light emitting unit 46 is, for example, an LED. The light emitting unit 46 is lit based on a signal from the control circuit 40. The communication interface is configured as an interface for performing data communication with the outside (such as a host apparatus). The communication interface 48 performs communication processes in cooperation with the control circuit 40.

Next, a positional relationship between the marker light irradiating unit 22 and the reflective mirror 24 will be described in detail with reference to FIG. 2.

In FIG. 2 showing the irradiation and reception of light, for the sake of a simplified explanation, a Z-axis direction is virtually set which is along an optical axis Lgr showing the center of reflected light Lr entering the light receiving sensor 23 and both an X-axis direction (vertical direction and a Y-axis direction (traverse direction) are set along a plane perpendicular to the Z-axis direction. In the present embodiment, the optical axis Lgm of the marker light Lm is set to be parallel with the optical axis Lgr, which is along the Z-axis direction.

As shown in FIG. 2, to reduce misalignment between the center of the imaging area and the center of the marker light Lm, the marker light irradiating unit 22 is disposed such that an optical axis Lgm of the marker light Lm is parallel with an optical axis Lgr that is the center of the imaging area provided by the light receiving sensor 23, and a distance X between the optical axis Lgm and the optical axis Lgr is as short as possible in actual design. According to the present embodiment, the marker light irradiating unit 22 is disposed such that the optical axis Lgm of the marker light Lm and the optical axis Lgr that is the center of the imaging area are substantially parallel to the substrate surface of the substrate 20a.

Therefore, according to the present embodiment, the marker light irradiating unit 22 is disposed such that the marker light Lm is close to an upper edge 24U of the reflective mirror 24 (an edge portion of the outer edge of the reflective mirror 24 farthest from the imaging lens 25). That is, the marker light Lm is in proximity to the upper edge 24U as much as possible, with acceptable level. Furthermore, to prevent the marker light irradiating unit 22 from entering the imaging area provided by the light receiving sensor 23, the marker light irradiating unit 22 is mounted on a substrate 20b that differs from the substrate 20a, so as to be positioned farther away from the reading opening 13 than the reflective mirror 24 is, in both the Z-axis and X-axis directions.

That is, the marker light irradiating unit 22 is provided in a position that is father away from the reading opening 13 than the reflective mirror 24 in both the Z-axis and X-axis directions. The marker light irradiating unit 22 is disposed such that the optical axis Lgm of the marker light Lm is parallel to the optical axis Lgr that is the center of the imaging area provided by the light receiving sensor 23, and the marker light Lm is close to the upper edge 24U (outer edge) of the reflective mirror 24.

By way of example, a distance Ls between the lower end of the beam-shaped marker light Lm and the upper edge 24U of the rectangular reflective mirror 24 can be set to zero in theory. Meanwhile, in practical design, a minute predetermined distance $\Delta Lmin$ is required as the distance. Hence, there can be provided a formula of $\Delta Lmin < Ls < \Delta Lmax$, where $\Delta Lmax$ is a maximum distance which still falls into a range showing "is close to the upper edge 24U". That is, "is close to the upper edge 24U" means "in proximity to the upper edge 24U or adjacent to the upper edge 24U" which keeps a relationship of ΔLmin≤Ls≤ΔLmax.

As a result of a configuration such as this, the marker light irradiating unit 22 and the light receiving sensor 23 are not required to be mounted the same substrate. Therefore, regarding the distance X between the optical axis Lgm of the marker light Lm and the optical axis Lgr that is the center of the imaging area, effects of the sizes of the light receiving sensor 23 and the marker light irradiating unit 22, the areas required for mounting the light receiving sensor 23 and the marker light irradiating unit 22, and the like can be eliminated. That is, because the marker light Lm passes near the upper edge of the reflective mirror 24, the distance X between the optical axis Lgm of the marker light Lm and the optical axis Lgr that is the center of the imaging area is determined based on the size of the reflective mirror 24. Therefore, the misalignment between the center of the marker light Lm and the center of the imaging area can be reduced without inhibiting size reduction of the optical information reader 10.

The placement of the marker light irradiating unit 22 is not limited to be such that the marker light Lm is close to (in proximity to or adjacent to) the upper edge 24U of the reflective mirror 24. The marker light irradiating unit 22 may be disposed such that the marker light Lm is close to (in proximity to or adjacent to) a portion of an outer edge other than the upper edge, such as a left-side edge 24L or a right-side edge 24R, of the reflective mirror 24. As a result of this configuration as well, the marker light Lm passes near the outer edge of the reflective mirror 24. Consequently, because the distance X between the optical axis Lgm of the marker light Lm and the optical axis Lgr that is the center of the imaging area is determined based on the size of the reflective mirror 24, the misalignment between the center of the marker light Lm and the center of the imaging area can be reduced without inhibiting size reduction of the optical information reader 10.

[Second Embodiment]

Next, an optical information reader according to a second embodiment of the present invention will be described with reference to FIG. 3.

Figure 3:
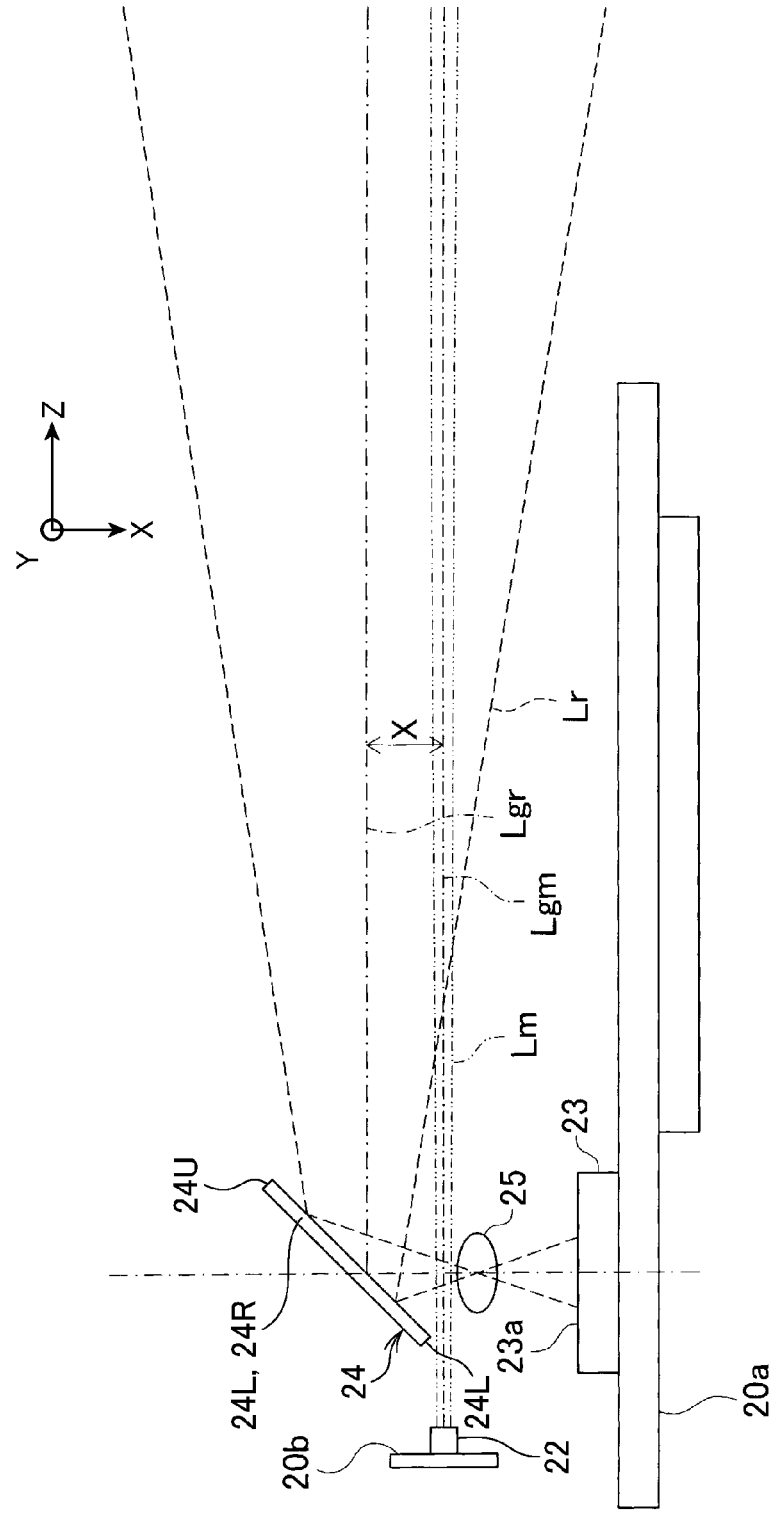
FIG. 3 is an explanatory diagram of a positional relationship between a marker light irradiating unit and a reflective mirror according to a second embodiment.

As shown in FIG. 3, the optical information reader according to the second embodiment mainly differs from that according to the above-described first embodiment in that the marker light irradiating unit 22 is disposed such that the marker light Lm is close to (in proximity to or adjacent to) a lower edge 24L (i.e., an edge portion of the outer edges that is close to the imaging lens 25) of the reflective mirror 24.

Therefore, the marker light Lm is irradiated such as to be closer to the substrate surface of the substrate 20a on which the light receiving sensor 23 is mounted, than the optical axis Lgr that is the center of the imaging area. The height of the optical system in the direction perpendicular to the substrate surface can be reduced. Further size reduction of the optical information reader 10 can be achieved.

[Third Embodiment]

Next, an optical information reader according to a third embodiment of the present invention will be described with reference to FIG. 4.

Figure 4:
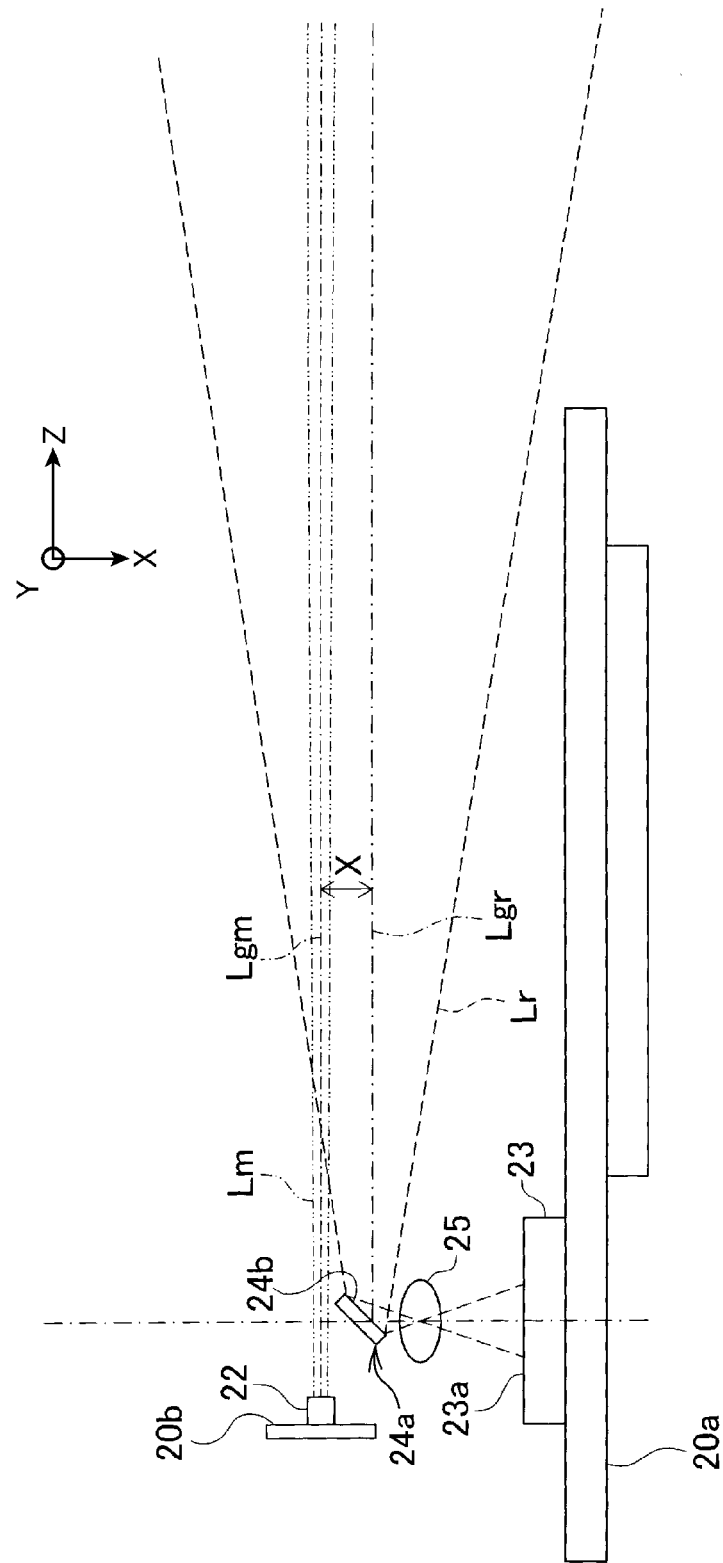
FIG. 4 is an explanatory diagram of a positional relationship between a marker light irradiating unit and a reflective mirror according to a third embodiment.

As shown in FIG. 4, the optical information reader according to the third embodiment mainly differs from that according to the above-described first embodiment in that a reflective mirror 24a is formed such that an overall surface of a reflective surface 24b thereof substantially matches the imaging area provided by the light receiving sensor 23.

When the overall surface of the reflective surface 24b of the reflective mirror 24a is formed such as to substantially match the imaging area provided by the light receiving sensor 23 in this way, the size of the reflective mirror 24a can be reduced without the imaging area provided by the light receiving sensor 23 being changed. Therefore, the distance X between the optical axis Lgm and the optical axis Lgr can be made shorter than that according to the above-described first embodiment. The misalignment between the center of the marker light Lm and the center of the imaging area can be further reduced.

In particular, according to the present embodiment, the reflective mirror 24a is disposed such as to be closer to the imaging lens 25, compared to that according to the above-described first embodiment. As a result, because the overall surface of the reflective surface 24b of the reflective mirror 24a is formed such as to substantially match the imaging area provided by the light receiving sensor 23, the size of the reflective mirror 24a can be further reduced. The distance X between the optical axis Lgm and the optical axis Lgr can be further reduced.

The characteristic configuration according to the present embodiment, that is, the overall surface of the reflective surface 24b of the reflective mirror 24a substantially matching the imaging area provided by the light receiving sensor 23, can also be applied to other embodiments.

[Fourth Embodiment]

Next, an optical information reader according to a fourth embodiment will be described with reference to FIG. 5.

The optical information reader according to the fourth embodiment mainly differs from that according to the above-described first embodiment in that the marker light irradiating unit 22 is mounted on the same substrate 20a as the light receiving sensor 23, and a marker light reflective mirror 26 is newly provided.

Figure 5:
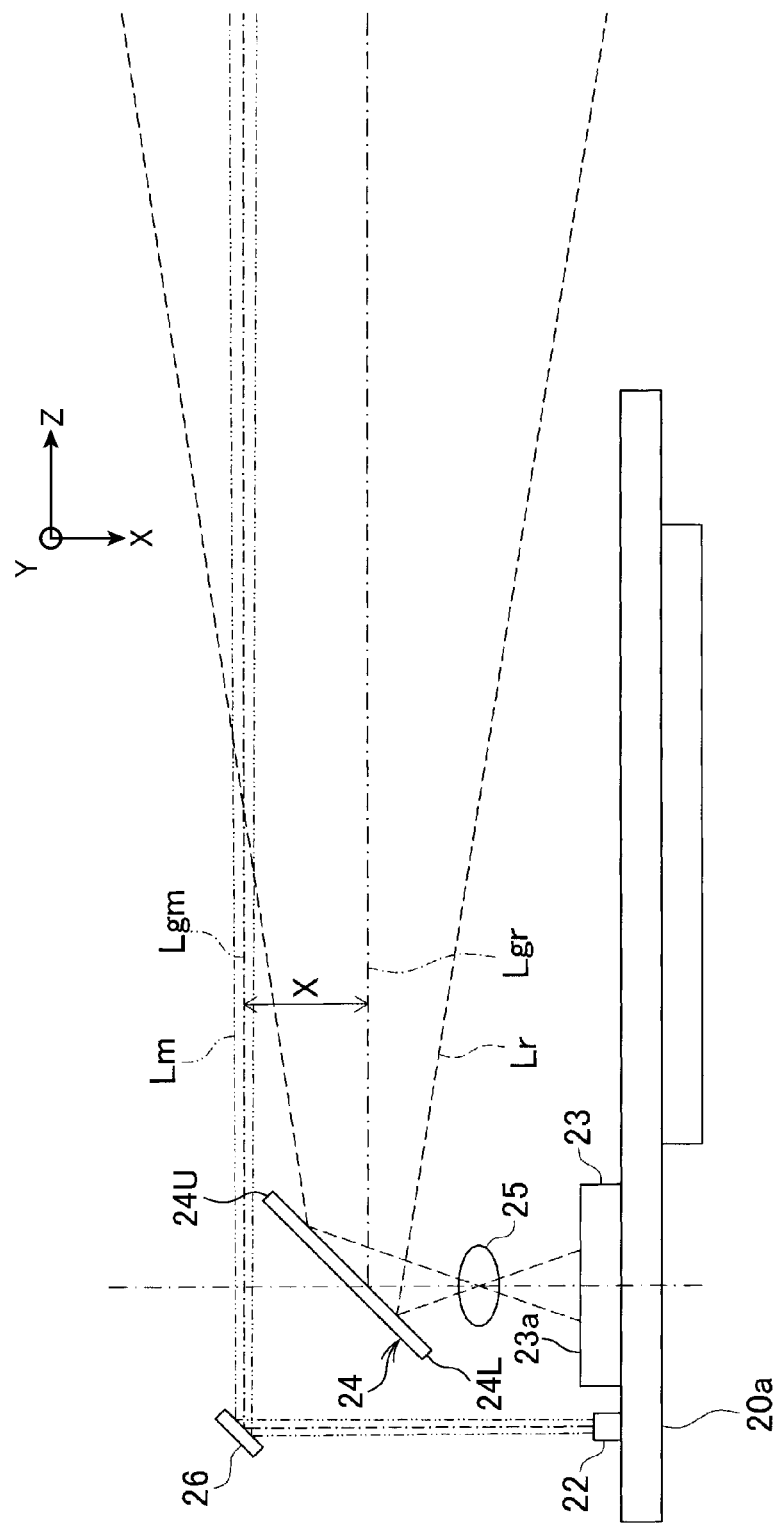
FIG. 5 is an explanatory diagram of a positional relationship between a marker light irradiating unit and a reflective mirror according to a fourth embodiment.

As shown in FIG. 5, the marker light irradiating unit 22 is mounted on the substrate 20a such that the marker light Lm is irradiated in a direction perpendicular to the substrate surface of the substrate 20a. The marker light reflective mirror 26 is disposed such that the marker light Lm irradiated from the marker light irradiating unit 22 is reflected such that the optical axis Lgm thereof is parallel to the optical axis Lgr that is the center of the imaging area provided by the light receiving sensor 23 and is close to the upper edge of the reflective mirror 24.

As a result, even when the marker light irradiating unit 22 and the light receiving sensor 23 are mounted on the same substrate 20a, the distance X between the optical axis Lgm of the marker light Lm and the optical axis Lgr that is the center of the imaging area is determined based on the size of the reflective mirror 24. Therefore, further size reduction of the optical information reader 10 can be achieved, while reducing the misalignment between the center of the marker light Lm and the center of the imaging area.

The placement of the marker light reflective mirror 26 is not limited to that in which the marker light Lm is close to (in proximity to or adjacent to) the upper edge 24U of the reflective mirror 24. The marker light reflective mirror 26 may be disposed such that the marker light Lm is close to a portion of an outer edge other than the upper edge 24U, such as a left-side edge 24L or a right-side edge 24R, of the reflective mirror 24. As a result of this configuration as well, the marker light Lm passes near the outer edge of the reflective mirror 24. Consequently, because the distance X between the optical axis Lgm of the marker light Lm and the optical axis Lgr that is the center of the imaging area is determined based on the size of the reflective mirror 24, the misalignment between the center of the marker light Lm and the center of the imaging area can be reduced without inhibiting size reduction of the optical information reader 10.

Figure 6:
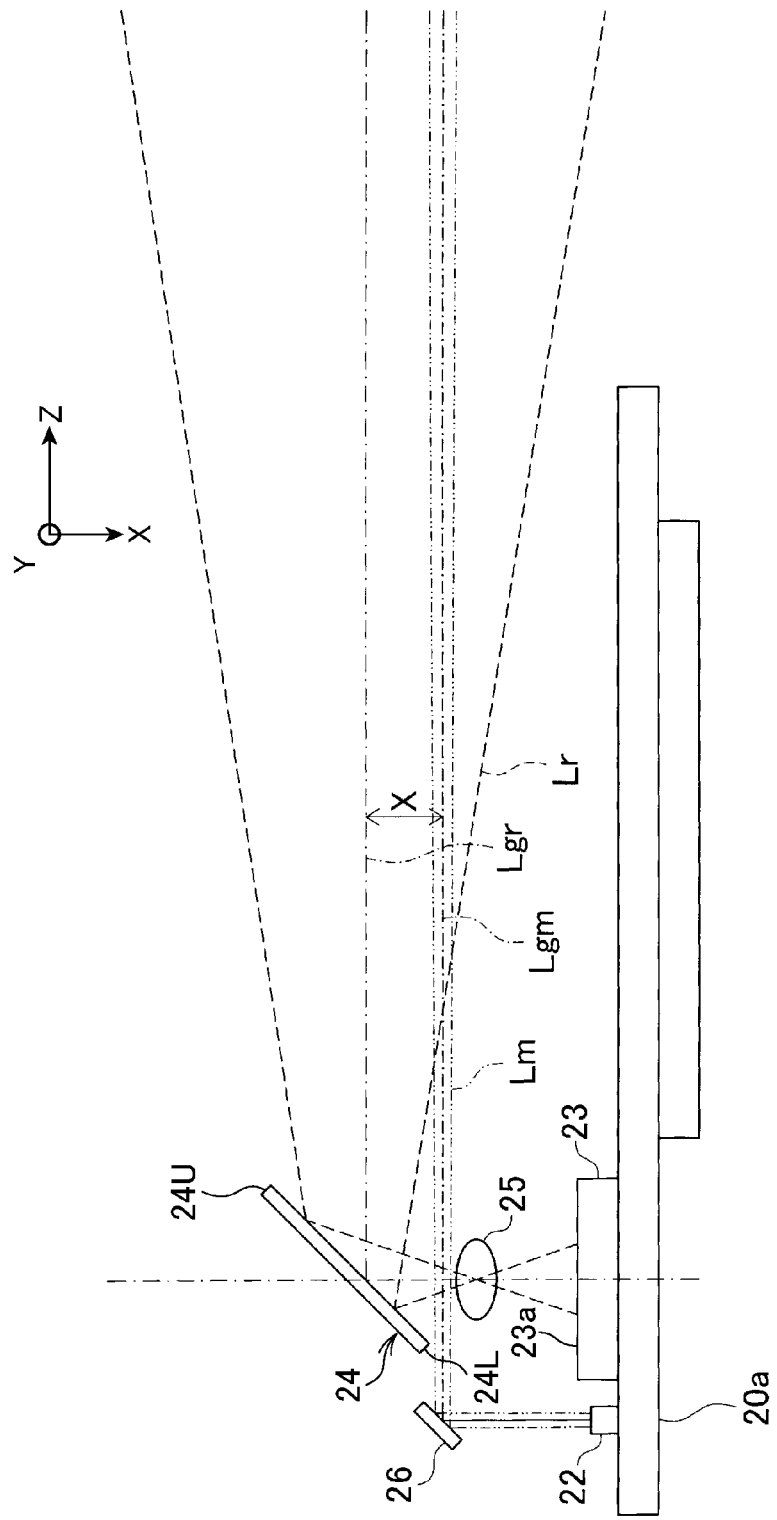
FIG. 6 is an explanatory diagram of the positional relationship between the marker light irradiating unit and the reflective mirror in a variation example according to the fourth embodiment.

In particular, as shown in FIG. 6, the marker light reflective mirror 26 may be disposed such that the marker light Lm is close to the lower edge 24L (i.e., an edge portion of the outer edges that is close to (in proximity to or adjacent to) the imaging lens 25) of the reflective mirror 24. In this case, the marker light Lm is irradiated such as to be closer to the substrate surface of the substrate 20a on which the light receiving sensor 23 is mounted, than the optical axis Lgr that is the center of the imaging area. Therefore, the height of the optical system in the direction perpendicular to the substrate surface can be reduced. Further size reduction of the optical information reader 10 can be achieved.

[Fifth Embodiment]

Next, an optical information reader according to a fifth embodiment of the present invention will be described with reference to FIG. 7 and FIG. 8.

The optical information reader according to the fifth embodiment mainly differs from that according to the above-described first embodiment in that the reflective mirror 24 is eliminated, and a marker light reflective mirror 51 is newly provided. The marker light reflective mirror 51 serves as a reflective element that reflects the marker light Lm towards the imaging area provided by the light receiving sensor 23.

Figure 7:
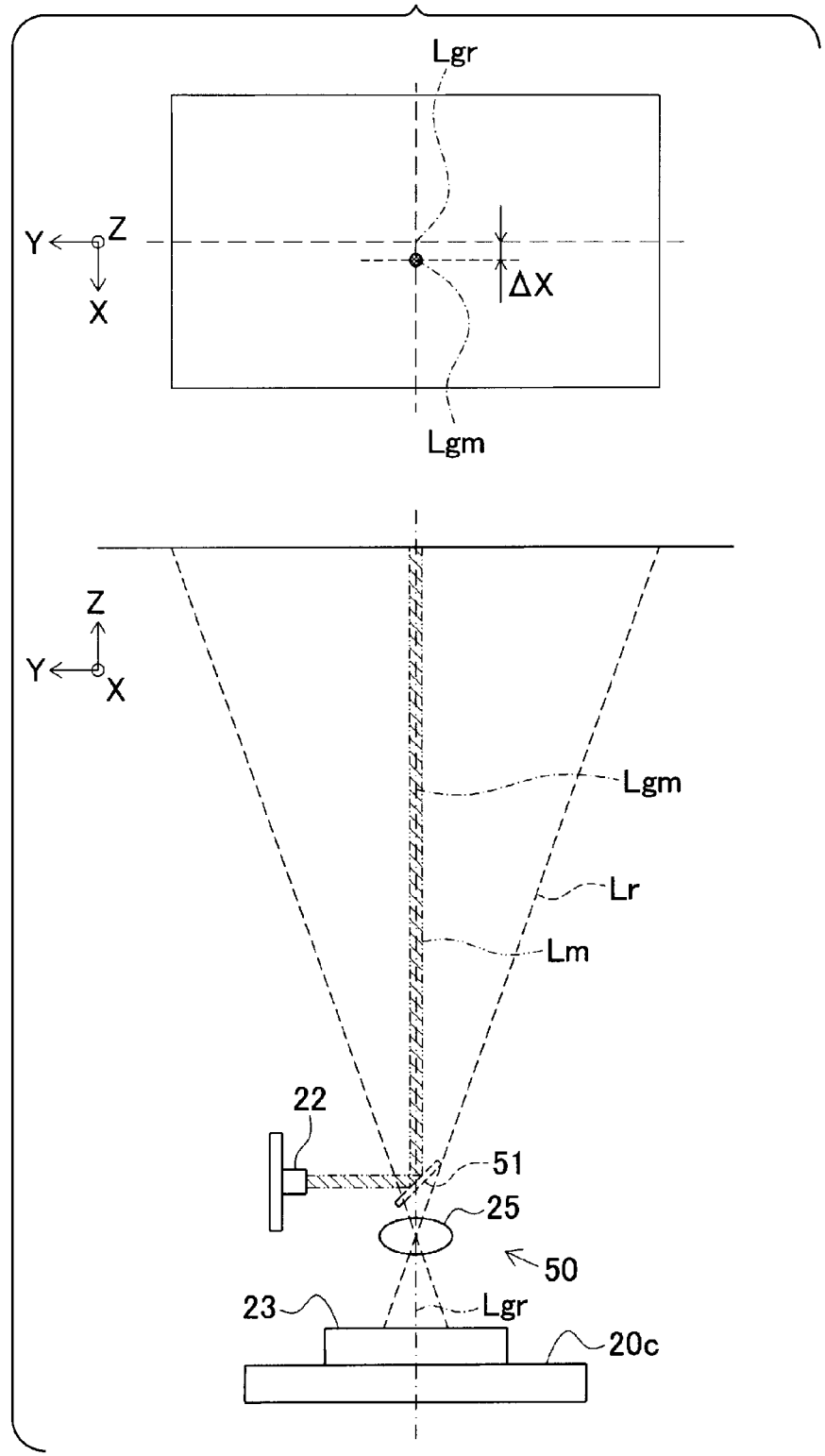
FIG. 7 is an explanatory diagram of a positional relationship between a light receiving sensor, and a marker light irradiating unit and a marker light reflective mirror according to a fifth embodiment.
Figure 8:
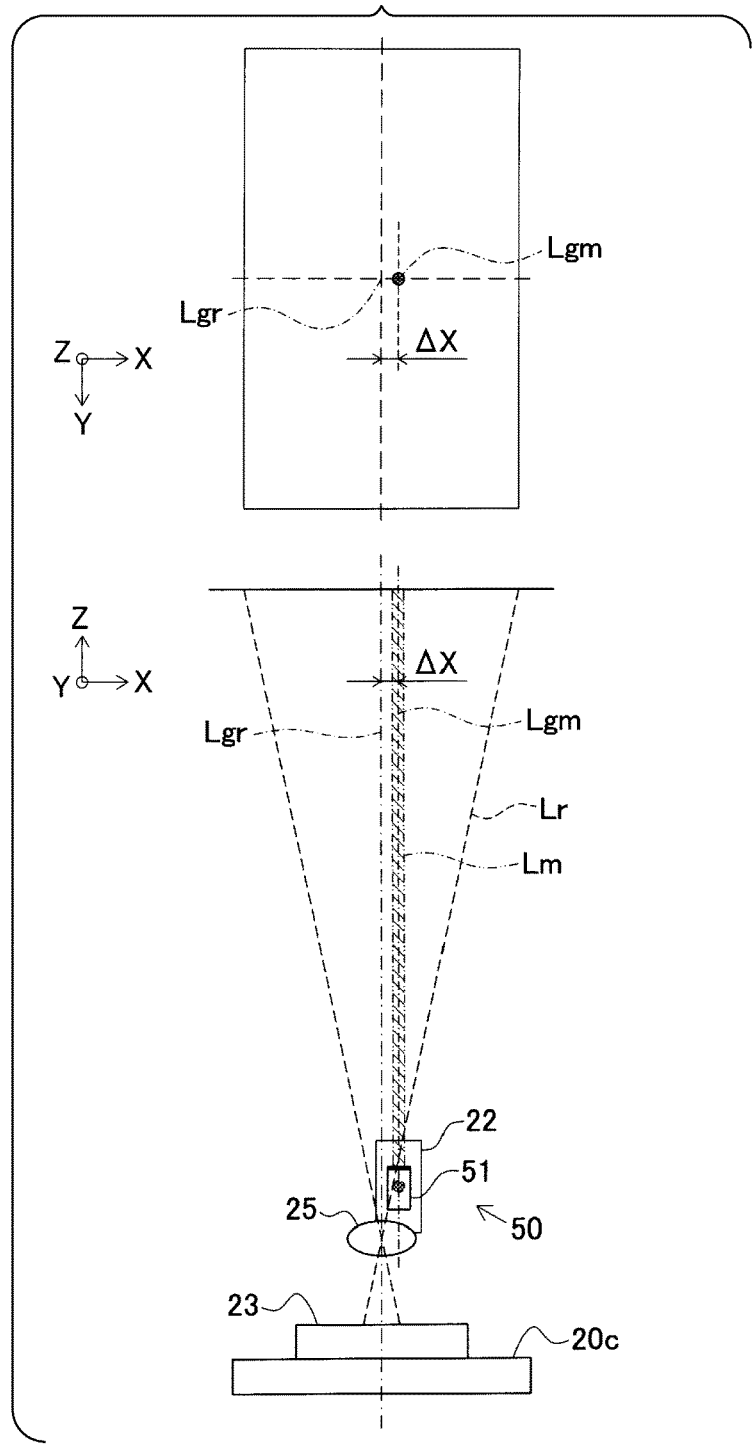
FIG. 8 is an explanatory diagram of the positional relationship between the light receiving sensor, and the marker light irradiating unit and the marker light reflective mirror according to the fifth embodiment, viewed from a Y-axis direction in relation to FIG. 7.

According to the present embodiment, as shown in FIG. 7 and FIG. 8, the light receiving sensor 23 is mounted on a reading module substrate 20c. The light receiving sensor 23 is disposed such that the optical axis Lgr that is the center of the imaging area thereof is substantially perpendicular to the substrate surface of the substrate 20c. A reading module 50 is assembled to the substrate 20c. The substrate 20c is disposed such that the reflected light Lr from the information code C is received by the light receiving sensor 23. The reflected light Lr enters the light receiving sensor 23 from the outside, through the reading opening 13.

According to the present embodiment, the marker light irradiating unit 22 is configured as an element of the reading module 50. The marker light irradiating unit 22 is disposed near the imaging lens 25 such that the marker light Lm is irradiated towards the exit side of the imaging lens 25 without intersecting with the optical axis Lgr.

The marker light reflective mirror 51 is disposed outside of the imaging area provided by the light receiving sensor 23 and near the imaging lens 25 such that the optical axis Lgm of the reflected marker light Lm and the optical axis Lgr that is the center of the imaging area are parallel and close to each other. More specifically, the marker light reflective mirror 51 is disposed such that the marker light Lm is reflected such that the optical axis Lgm and the optical axis Lgr match in a Y-axis direction, as shown in FIG. 7, and the optical axis Lgm and the optical axis Lgr are misaligned by a distance ΔX in the X-axis direction, as shown in FIG. 5. The imaging area provided by the light receiving sensor 23 becomes narrow near the imaging lens 25. Therefore, the marker light reflective mirror 51 can be more easily placed near the optical axis Lgr without being imaged by the light receiving sensor 23. The distance ΔX between the optical axis Lgm and the optical axis Lgr is reduced.

In this way, according to the present embodiment, the marker light reflective mirror 51 is provided as a reflective element that reflects the marker light Lm irradiated from the marker light irradiating unit 22 towards the imaging area provided by the light receiving sensor 23. The marker light reflective mirror 51 is disposed outside of the imaging area provided by the light receiving sensor 23 and near the imaging lens 25 such that the optical axis Lgm of the reflected marker light Lm and the optical axis Lgr that is the center of the imaging area provided by the light receiving sensor 23 are parallel and close to each other.

As a result, regarding the distance ΔX between the optical axis Lgm of the marker light Lm and the optical axis Lgr that is the center of the imaging area, the effects of the sizes of the light receiving sensor 23 and the marker light irradiating unit 22, the areas required for mounting the light receiving sensor 23 and the marker light irradiating unit 22, and the like can be eliminated. That is, because the imaging area becomes narrow near the imaging lens 25, the marker light reflective mirror 51 can be more easily placed near the optical axis Lgr of the imaging area provided by the light receiving sensor 23, without entering the imaging area. Therefore, the misalignment between the center of the marker light Lm and the center of the imaging area can be reduced without inhibiting size reduction of the optical information reader 10.

[Sixth Embodiment]

Next, an optical information reader according to a sixth embodiment of the present invention will be described with reference to FIG. 9 to FIG. 13.

The optical information reader according to the sixth embodiment mainly differs from that according to the above-described fifth embodiment in that a marker light irradiating unit 61 and a marker light lens 64 are used instead of the marker light irradiating unit 22 and the marker light reflective mirror 51.

Figure 9:
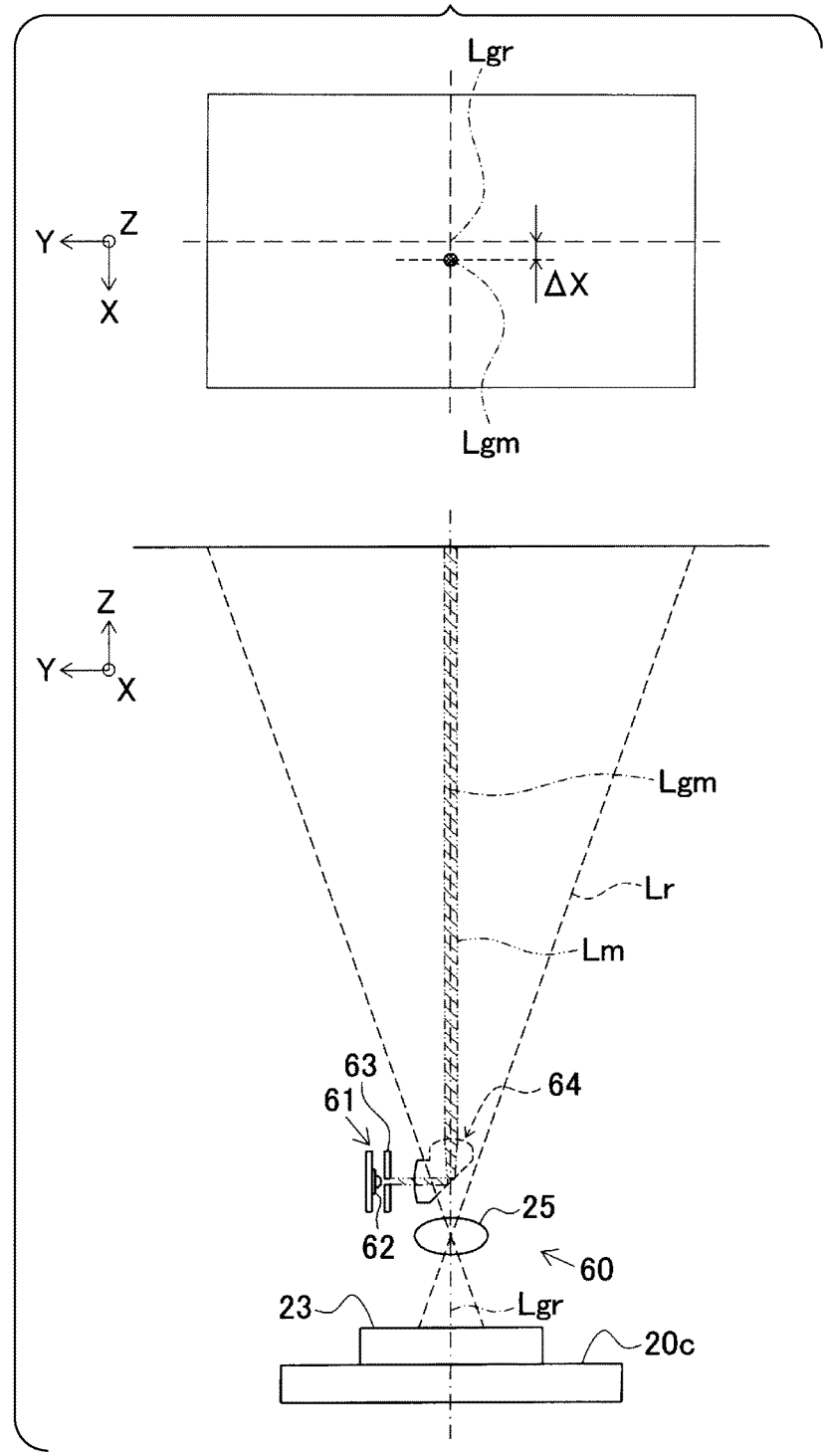
FIG. 9 is an explanatory diagram of a positional relationship between a light receiving sensor, and a marker light irradiating unit and a marker light lens according to a sixth embodiment.
Figure 10:
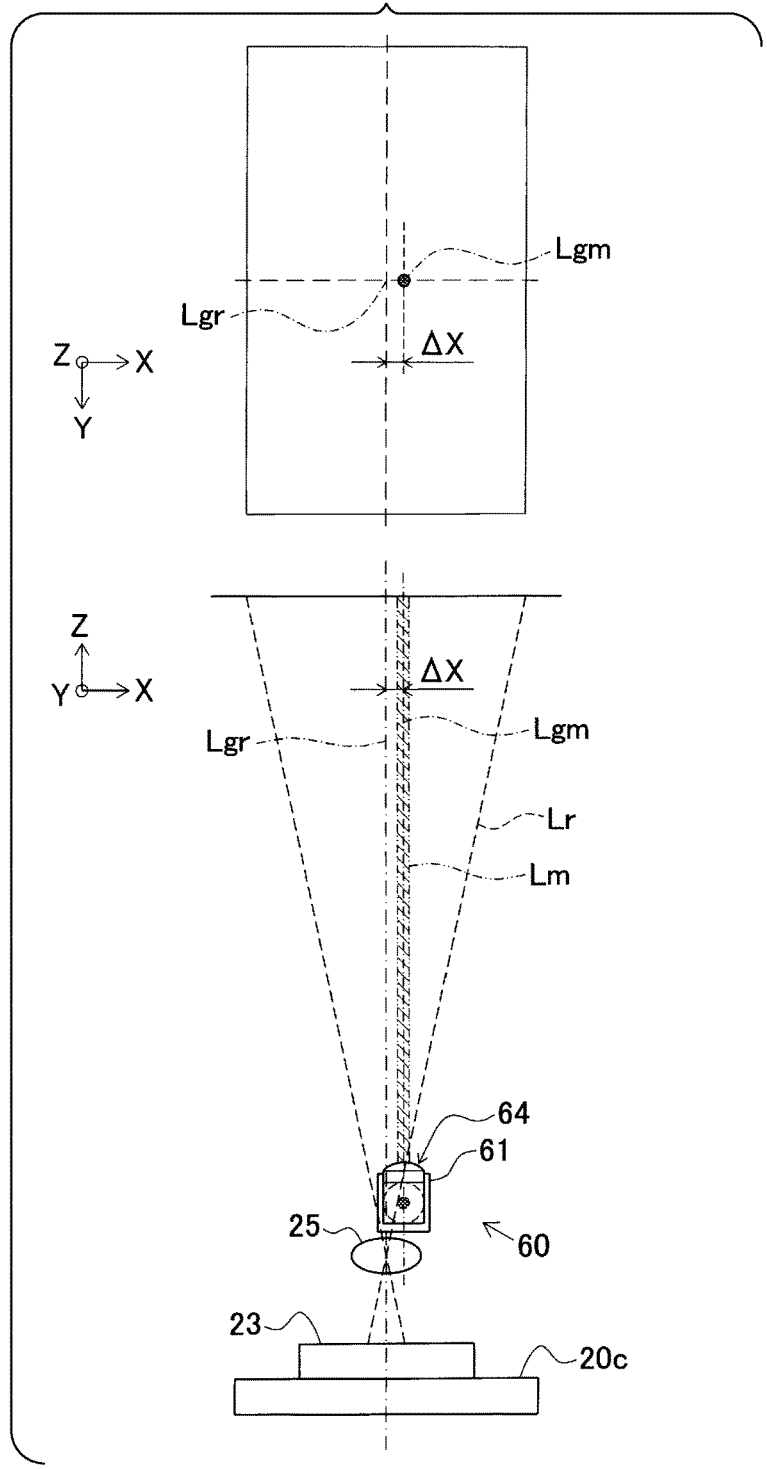
FIG. 10 is an explanatory diagram of the positional relationship between the light receiving sensor, and the marker light irradiating unit and the marker light lens according to the sixth embodiment, viewed from a Y-axis direction in relation to FIG. 9.
Figure 11:
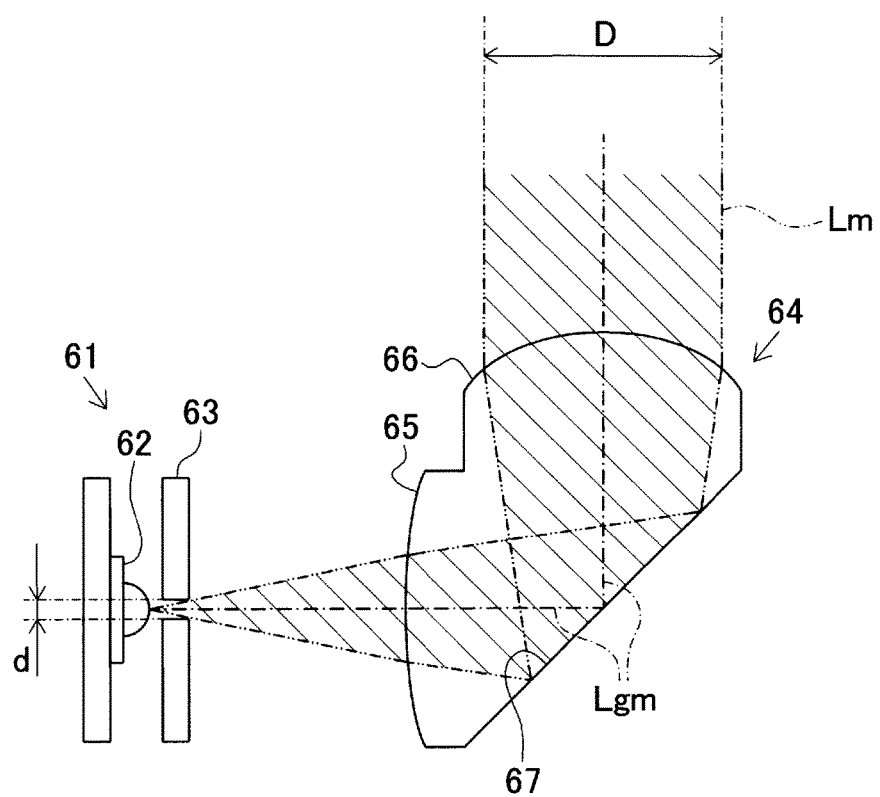
FIG. 11 is an enlarged, cross-sectional view of the marker light lens in FIG. 9.

According to the present embodiment, as shown in FIG. 9 to FIG. 11, the marker light irradiating unit 61, which is configured as an element of a reading module 60, includes a marker light LED 62 and a marker light diaphragm 63. Unlike the marker light irradiating unit 22, the marker light irradiating unit 61 is not provided with a lens for collecting and collimating the marker light Lm. Therefore, light irradiated from the LED 62 enters the marker light lens 64 as the marker light Lm, while spreading in a state in which the light is narrowed by the marker light diaphragm 63.

The marker light lens 64 is configured as a reflective element that has an entry face 65, an exit face 66, and a reflective surface 67. The reflective surface 67 internally reflects the marker light Lm that has entered through the entry face 65 towards the exit face 66, such that the optical axis Lgm of the marker light Lm is parallel to the optical axis Lgr that is the center of the imaging area. The marker light lens 64 is configured as a collimate lens that collects and collimates the marker light Lm based on the curvatures of the entry face 65 and the exit face 66.

In a manner similar to the above-described marker light reflective mirror 51, the marker light lens 64 is disposed outside of the imaging area provided by the light receiving sensor 23 and near the imaging lens 25. More specifically, the marker light lens 64 is disposed such that the optical axis Lgm and the optical axis Lgr match in the Y-axis direction shown in FIG. 9, and the optical axis Lgm and the optical axis Lgr are misaligned by a distance ΔX in the X-axis direction shown in FIG. 10.

Here, the curvatures of the entry face 65 and the exit face 66 will be described.

The entry face 65 is formed having a curvature that enables the incident marker light Lm to be totally reflected by the reflective surface 67 as a result of being collected. The exit face 66 is formed having a curvature that enables the marker light Lm reflected by the reflective surface 67 to be collimated as a result of being collected. The curvature of the exit face 66 is greater than that of the entry face 65.

Figure 12A:
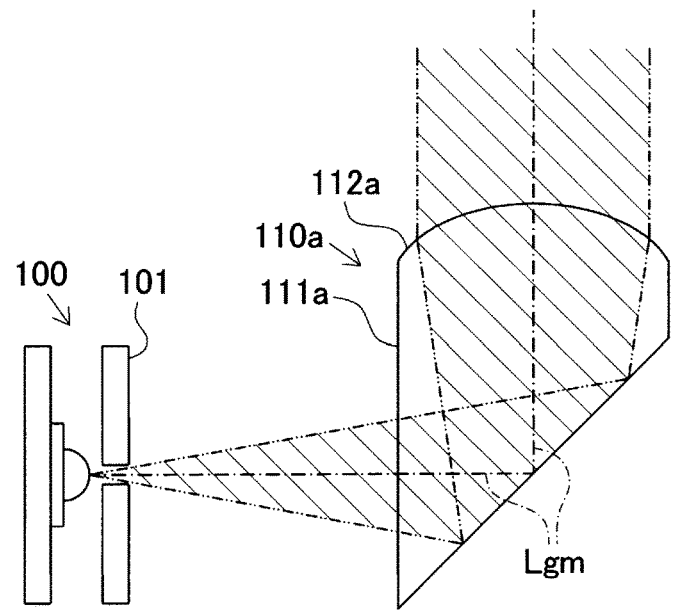
FIG. 12A is an explanatory diagram for explaining a state in which a marker light is collimated by a lens of which an entry face is a planar surface and an exit face is a curved surface.
Figure 12B:
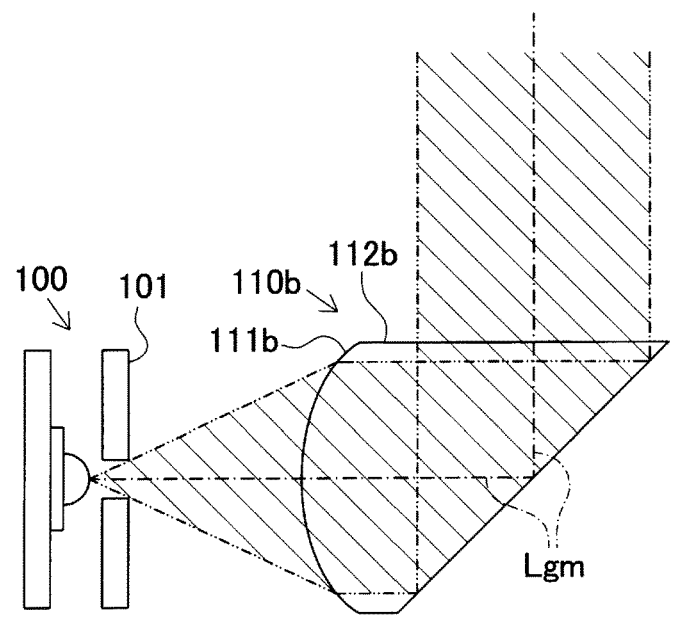
FIG. 12B is an explanatory diagram explaining a state in which the marker light is collimated by a lens of which the entry face is a curved surface and the exit face is a planar surface.

In addition, in a lens 110a in which an entry face 111a is a planar surface and an exit face 112a is a curved surface, as shown in FIG. 12A, the distance from the position of a diaphragm 101 of a marker light irradiating unit 100 to the curved surface is longer than that in a lens 110b in which an entry face 111b is a curved surface and an exit face 112b is a planar surface. That is, as a result of the lens being formed such that the curvature of the exit face is greater than that of the entry face, compared to when the curvature of the exit face is smaller than that of the entry face, the effect is equivalent to that when the lens 110 is placed father from the position of the diaphragm 101 of the marker light irradiating unit 100.

In addition, even when the marker light Lm is collimated and emitted, should the distance (see reference number L in FIG. 13) from the lens 110 to the reading target and the diameter (see reference number d in FIG. 13) of the diaphragm 101 of the marker light irradiating unit 100 be fixed, a spot diameter D (see reference numbers D1 and D2 in FIG. 13) of the marker light Lm irradiated onto the reading target becomes smaller as the distance from the position of the diaphragm 101 to the lens 110 becomes longer, as is clear from the disclosure regarding FIG. 13A and FIG. 13B, and a following expression (1).

$$D = d \times L/B \tag{1}$$

When the spot diameter D becomes smaller in this way, the marker light Lm becomes brighter. Therefore, as shown in FIG. 11, as a result of the curvature of the exit face being set to be greater than the curvature of the entry face, the marker light Lm can be made brighter due to the spot diameter D becoming smaller.

In this way, according to the present embodiment, the marker light lens 64 functions as a reflective element and has the entry face 65, the exit face 66, and the reflective surface 67. The reflective surface 67 internally reflects the marker light Lm that has entered through the entry face 65 towards the exit face 66, such that the optical axis Lgm of the marker light Lm is parallel to the optical axis Lgr that is the center of the imaging area. The marker light lens 64 is configured as a collimate lens that collects and collimates the marker light Lm based on the curvatures of the entry face 65 and the exit face 66.

As a result, the marker light lens 64 provides both a function as the collimate lens for the marker light Lm and a function as a reflective lens. Consequently, a collimate lens is no longer required in the marker light irradiating unit 61. The number of components can be reduced, and size reduction of the optical information reader 10 can be achieved.

In particular, the marker light lens 64 is formed such that the curvature of the exit face 66 is greater than the curvature of the entry face 65. Therefore, the distance from the position of the diaphragm to the lens is essentially increased. The marker light Lm can be made brighter as a result of the spot diameter D becoming smaller. As a result, visibility of the marker light Lm can be improved.

The marker light lens 64 may also be configured as a lens (reflective element) that collects and collimates the marker light Lm based on the curvature of at least either of the entry face 65 and the exit face 66, depending on the required degree of visibility of the marker light Lm and the like. For example, depending on the required degree of visibility of the marker light Lm and the like, the marker light lens 64 may be formed such that the entry face is a planar surface and the exit face is a curved surface as shown in the example in FIG. 12A. Alternatively, the marker light lens 64 may be formed such that the entry face is a curved surface and the exit face is a planar surface as shown in the example in FIG. 12B.

[Seventh Embodiment]

Next, an optical information reader according to a seventh embodiment of the present invention will be described with reference to FIG. 14 to FIG. 16.

The optical information reader according to the seventh embodiment mainly differs from that according to the above-described sixth embodiment in that a marker light irradiating unit 71 and a marker light lens 72 are used instead of the marker light irradiating unit 61 and the marker light lens 64, to reduce misalignment between the center of a marker light irradiated in a predetermined pattern such as to indicate outer edges of the imaging area provided by the light receiving sensor 23, and the center of the imaging area.

Figure 14:
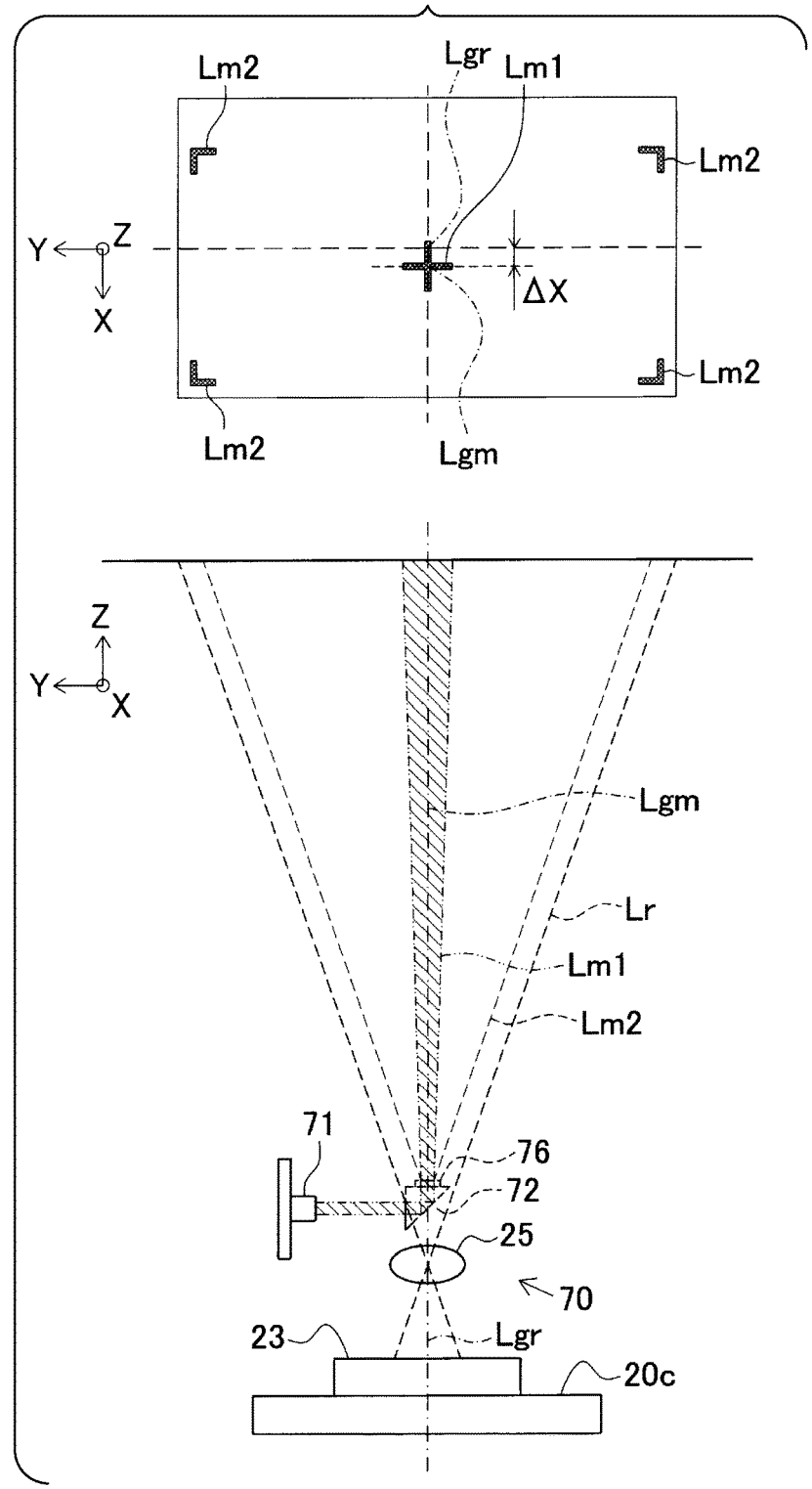
FIG. 14 is an explanatory diagram of a positional relationship between a light receiving sensor, and a marker light irradiating unit and a marker light lens according to a seventh embodiment.
Figure 15:
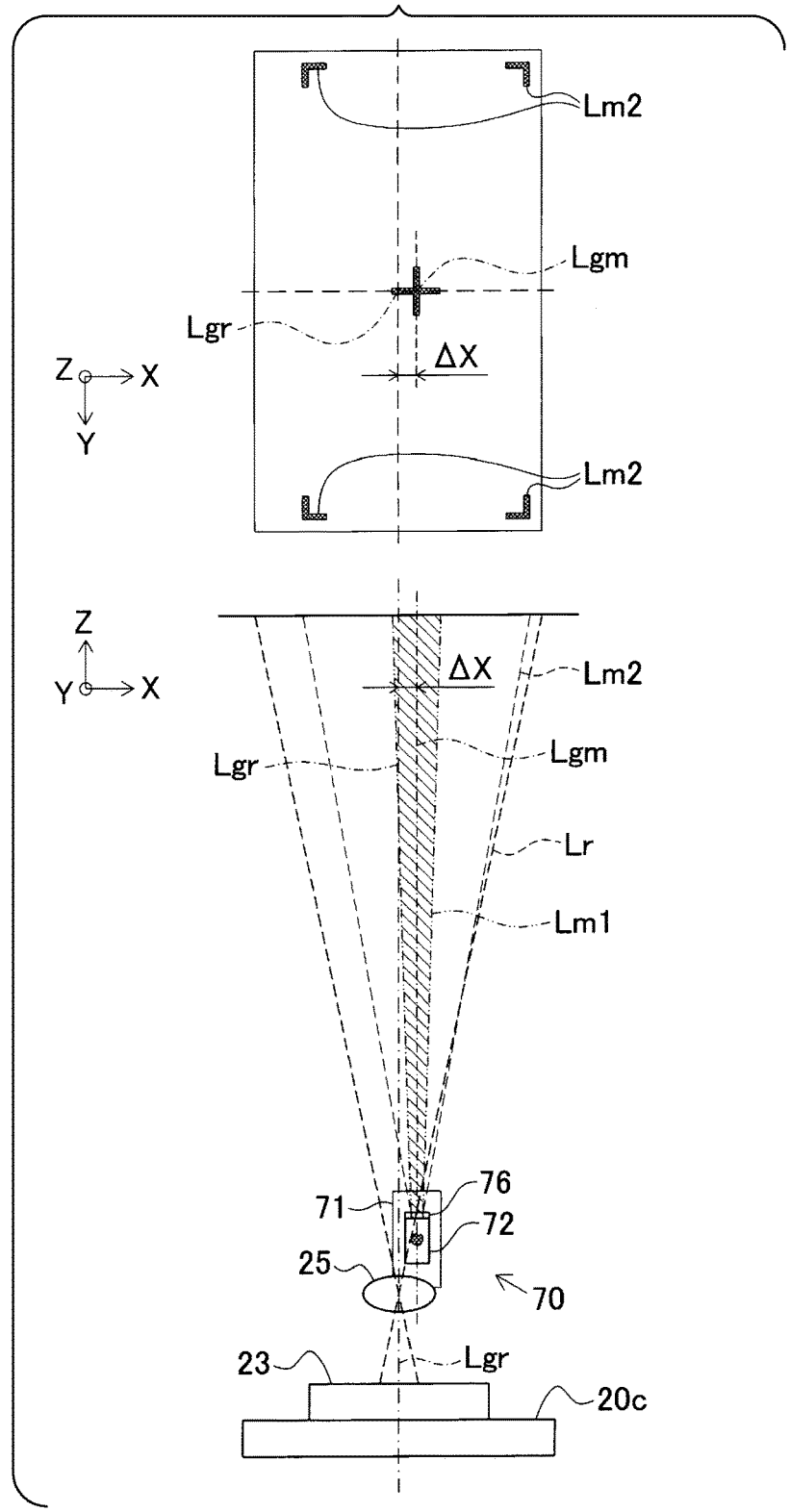
FIG. 15 is an explanatory diagram of the positional relationship between the light receiving sensor, and the marker light irradiating unit and the marker light lens according to the seventh embodiment, viewed from a Y-axis direction in relation to FIG. 14.

According to the present embodiment, as shown in FIG. 14 and FIG. 15, the marker light irradiating unit 71, which is configured as an element of a reading module 70, is composed of a laser diode or the like that emits a laser light as the marker light Lm.

Figure 16:
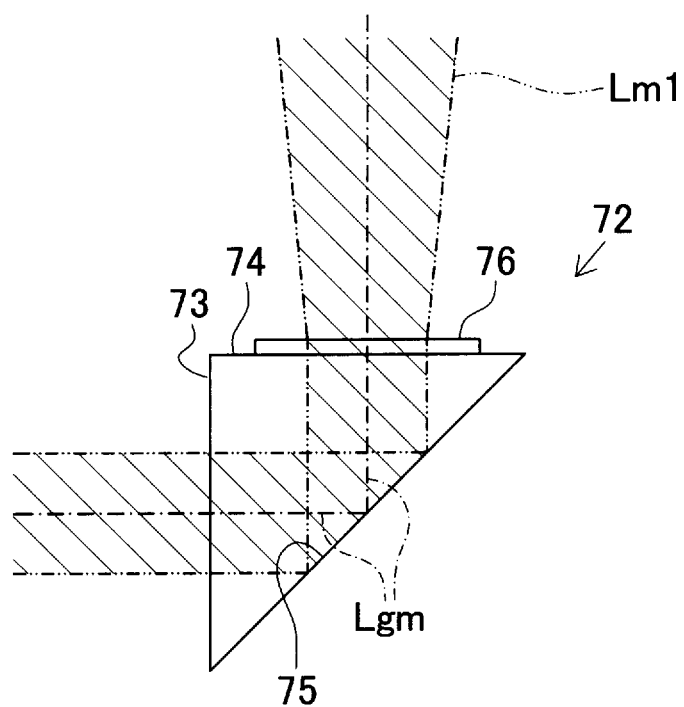
FIG. 16 is an enlarged cross-sectional view of the marker light lens in FIG. 14.

As shown in FIG. 16, the marker light lens 72 is configured as a reflective element that has an entry face 73, an exit face 74, and a reflective surface 75. The reflective surface 75 internally reflects the marker light Lm that has entered through the entry face 73 towards the exit face 74, such that the optical axis Lgm of the marker light Lm is parallel to the optical axis Lgr that is the center of the imaging area. In addition, the marker light Lm from the marker light irradiating unit 71 enters the marker light lens 72 as laser light. Therefore, a curved surface for light collection is not required in the entry face 73 and the exit face 74.

In particular, in the marker light lens 72, a diffractive optical element (diffraction grating) is integrally provided with the exit face 74. For example, the diffractive optical element 76 is a computer-generated hologram (CGH) or the like. The diffractive optical element 76 divides the light that has entered through the reflective surface 75 into a cross-shaped marker light Lm1 and four marker lights Lm2. The marker light Lm1 indicates the optical axis Lgm of the marker light Lm. The marker lights Lm2 are symmetrical in relation to the optical axis Lgm. In particular, the diffractive optical element 76 is configured such that the four marker lights Lm2 indicate the four corners of the imaging area provided by the light receiving sensor 23.

In a manner similar to the above-described marker light reflective mirror 51 and marker light lens 64, the marker light lens 72 that is configured as described above is disposed outside of the imaging area provided by the light receiving sensor 23 and near the imaging lens 25. More specifically, the marker light lens 72 is disposed such that the optical axis Lgm and the optical axis Lgr match in the Y-axis direction shown in FIG. 14, and the optical axis Lgm and the optical axis Lgr are misaligned by the distance ΔX in the X-axis direction shown in FIG. 15.

In this way, according to the present embodiment, the marker light lens 72 has a reflective surface 75 that performs internal reflection. The exit face 74 of the marker light lens 72 is provided with the diffractive optical element 76. The diffractive optical element 76 diffracts the marker light that is internally reflected by the reflective surface 75 such as to form a predetermined pattern. As a result, even when the marker lights Lm1 and Lm2 that are formed into the predetermined pattern are irradiated such as to indicate the outer edges of the imaging area, misalignment between the center of the predetermined pattern functioning as the marker light and the center of the imaging area can be reduced.

The diffractive optical element 76 provided in the exit face 74 is not limited to that which is configured to divide (irradiate) the light entering through the reflective surface 75 into the marker light Lm1 and the four marker lights Lm2 to form the predetermined pattern, as described above. The diffractive optical element 76 may be configured to irradiate light that forms another pattern to enable visibility of the imaging area. In addition, the diffractive optical element 76 is not limited to that which is integrally formed with the exit surface 74, as described above. The diffractive optical element 76 may be formed as a separate component and subsequently assembled to the exit face 74.

[Other Embodiments]

The present invention is not limited to the above-described embodiments. For example, the present invention may be actualized in the following manner.

(1) According to the above-described embodiments, the reflective mirrors 24 and 24a, and the marker light irradiating unit 22 are disposed such that the optical axis Lgm of the marker light Lm and the optical axis Lgr that is the center of the imaging area are substantially parallel to the substrate surface of the substrate 20a. However, the present invention is not limited thereto. The reflective mirrors 24 and 24a, and the marker light irradiating unit 22 may be disposed such that the optical axis Lgm and the optical axis Lgr are at an angle to the substrate surface of the substrate 20a.

(2) The present invention can be applied to an information reader that is also provided with other functions, such as a wireless communication function for wirelessly communicating with a wireless communication medium, in addition to the function for optically reading an information code.

EXPLANATION OF REFERENCE NUMBERS

10: optical information reader
13: reading opening
20a: substrate
22: marker light irradiating unit
23: light receiving sensor
24, 24a: reflective mirror
25: imaging lens
26: marker light reflective mirror
51: marker light reflective mirror (reflective element)
61, 71: marker light irradiating unit
64, 72: marker light lens (reflective element)
65, 73: entry face
66, 74: exit face
67, 75: reflective surface
76: diffractive optical element
Lm: marker light
Lr: reflected light

What is claimed is:

1. An optical information reader comprising:
a light receiving sensor provided with a light receiving surface, the light receiving sensor being capable of imaging an information code;
a reflective mirror that reflects light reflected, in a given direction, from an outside of the reader through a reading opening towards the light receiving sensor, the light reflected from the outside of the reader forming a spatial imaging area, the imaging area being provided according to the light receiving surface and having a central optical axis passing in the given direction;
an imaging lens that collects the light reflected by the reflective mirror so as to provide an image to the light receiving surface of the light receiving sensor; and
a marker light irradiating unit that irradiates a marker light in the given direction, wherein
the marker light irradiating unit is positioned farther away from the reading opening than the reflective mirror is, and disposed such that the marker light has an optical axis passing in the given direction that is parallel to the central optical axis of the imaging area and the marker light is close to an outer edge of the reflective mirror.

2. The optical information reader according to claim 1, wherein:
the marker light irradiating unit is disposed such that the marker light is close to an edge portion of an outer edge of the reflective mirror, the edge portion being the closest to the imaging lens than remaining edge portions of the outer edge are.

3. The optical information reader according to claim 2, wherein:
the reflective mirror is provided with a reflected surface having an overall surface matching the imaging area.

4. The optical information reader according to claim 3, wherein:
the marker light irradiating unit and the light receiving sensor are mounted on the same substrate,
the reader comprising:
a marker light reflective mirror that reflects the marker light irradiated from the marker light irradiating unit such that the optical axis of the marker light is parallel to the central optical axis of the imaging area and the marker light is close to an outer edge of the reflective mirror.

5. The optical information reader according to claim 2, wherein:
the marker light irradiating unit and the light receiving sensor are mounted on the same substrate,
the reader comprising:
a marker light reflective mirror that reflects the marker light irradiated from the marker light irradiating unit such that the optical axis of the marker light is parallel to the optical axis that is the center of the imaging area provided by the light receiving sensor and the marker light is close to an outer edge of the reflective mirror.

6. The optical information reader according to claim 5, wherein
the reflective element is configured as a lens that has an entry face, an exit face, and a reflective surface that performs internal light reflection toward the exit face such that the marker light from the entry face has an optical axis becomes parallel with the central optical axis of the imaging area, and
the exit face of the reflective element is provided with a diffractive optical element that diffracts the marker light that has been internally reflected by the reflective surface, to form a predetermined pattern.

7. The optical information reader according to claim 1, wherein:
the reflective mirror is provided with a reflected surface having an overall surface matching the imaging area.

8. The optical information reader according to claim 7, wherein:
the marker light irradiating unit and the light receiving sensor are mounted on the same substrate,
the reader comprising:
a marker light reflective mirror that reflects the marker light irradiated from the marker light irradiating unit such that the optical axis of the marker light is parallel to the central optical axis of the imaging area and the marker light is close to the outer edge of the reflective mirror.

9. The optical information reader according to claim 8, wherein:
the outer edge of the reflective mirror is a lower edge of the reflective mirror and the marker light passes between the reflective mirror and the light receiving sensor.

10. The optical information reader according to claim 1, wherein:
the marker light irradiating unit and the light receiving sensor are mounted on the same substrate,
the reader comprising:
a marker light reflective mirror that reflects the marker light irradiated from the marker light irradiating unit such that the optical axis of the marker light is parallel to the central optical axis of the imaging area and the marker light is close to an outer edge of the reflective mirror.

11. The optical information reader according to claim 1, wherein:
the marker light irradiating unit is provided so as to make the irradiated marker light directly enter the imaging area.

12. The optical information reader according to claim 1, wherein:
the outer edge of the reflective mirror is a lower edge of the reflective mirror and the marker light passes between the reflective mirror and the light receiving sensor.

13. An optical information reader comprising:
a light receiving sensor provided with a light receiving surface, the light receiving sensor being capable of imaging an information code;
an imaging lens collecting light reflected, in a given direction, from an outside of the reader through a reading opening such that the collected light provides an image to the light receiving surface of the light receiving sensor, the light reflected from the outside of the reader forming a spatial imaging area, the imaging area being provided according to the light receiving surface and having a central optical axis passing in the given direction;
a marker light irradiating unit that irradiates a marker light in the given direction; and
a reflective element reflecting the irradiated marker light towards the reading opening in the given direction,
wherein the reflective element is disposed outside of the imaging area and positionally close to the imaging lens such that the reflected marker light has an optical axis passing in the given direction, and the optical axis and the central optical axis of the imaging area are positionally parallel and close to each other.

14. The optical information reader according to claim 13, wherein
the reflective element has an entry face, an exit face, and a reflective surface,
the reflective surface internally reflects the marker light that has entered from the entry face towards the exit face such that the optical axis of the marker light is parallel to the central optical axis of the imaging area, and
the reflective element is configured as a collimate lens that collects and collimates the marker light based on a curvature of at least either of the entry face and the exit face.

15. The optical information reader according to claim 14, wherein the reflective element is formed such that a the exit face has a curvature which is greater than a curvature of the entry lens.

* * * * *